No. 793,707. PATENTED JULY 4, 1905.
A. WULTZE.
PROCESS OF ABSORBING GASES.
APPLICATION FILED DEC. 11, 1902.
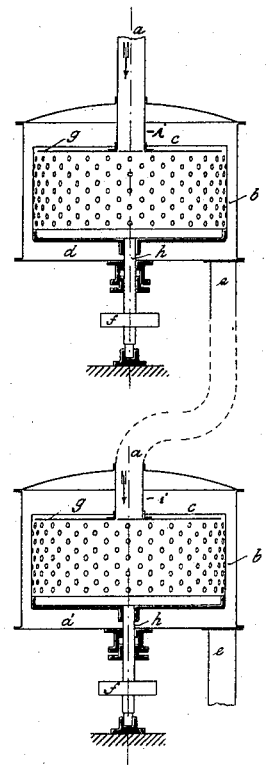

No. 793,707.

Patented July 4, 1905.

UNITED STATES PATENT OFFICE.

ADOLF WULTZE, OF CHARLOTTENBURG, GERMANY.

PROCESS OF ABSORBING GASES.

SPECIFICATION forming part of Letters Patent No. 793,707, dated July 4, 1905.

Application filed December 11, 1902. Serial No. 134,831.

*To all whom it may concern:*

Be it known that I, ADOLF WULTZE, doctor of philosophy, a subject of the King of Prussia, German Emperor, residing at Salzufer, Charlottenburg, Kingdom of Prussia, German Empire, have invented new and useful Improvements in Processes for the Absorption of Gases, of which the following is a specification.

This invention relates to a process by means of which carbonic acid may be recovered in the form of alkaline bicarbonates from gases containing a relatively small proportion of carbonic acid besides other gases. The recovering of the carbonic acid from such gases has been practically difficult.

An apparatus for carrying out the novel process is illustrated in the accompanying drawing in vertical section.

I have discovered that a gas is capable of being united with a substance dissolved in a suitable liquid in a particularly advantageous manner when the liquid is supplied in the form of foam or froth, and when provision is made for repeated breaking up of the froth in the liquid froth is formed, which froth is transformed to smaller bubbles that are again divided. Also fresh froth is formed and again divided. Finally the froth is destroyed, whereby a solution containing the carbonic acid in combined form results.

The process is especially applicable for recovering carbonic acid from combustion-gases by means of carbonate solutions—carbonate of potassium, for example. When, as it has hitherto been done, the carbonic acid to be recovered has been converted into bicarbonate by causing potassium-carbonate solutions to trickle over indifferent or neutral material, these combustion-gases come into contact with the carbonate solution which has taken up the most carbonic acid, so that only a small percentage of the carbonic acid present in the combustion-gases is recovered. This is also the case when the combustion-gases are caused to pass through liquids without the employment of auxiliary means for producing an increased formation of bicarbonates. By means of this novel process, however, a far larger part of the carbonic acid present in the gases is caused to be converted into bicarbonate.

The operation is as follows: The carbonate liquid, together with the gases, is converted into a froth, the froth being broken up repeatedly, so that small froth bubbles are produced from the large bubbles. If necessary, froth may be again formed and then again broken up. For the purpose of producing froth it is usually sufficient to employ alkali-carbonate solutions containing small quantities of fatty impurities, as they are present in most cases in the potash lye used for industrial purposes. Sometimes it is sufficient to employ alkali-carbonate solutions alone, as the oily substances, mainly of an empyreumatic nature, contained in the combustion-gases suffice for the production of froth. Substances may also be added to the carbonate liquid which cause a formation of froth. For example, a small quantity of soap may be added to the alkaline liquids. In cases in which soap would be liable to decomposition other substances may be employed for the purpose of producing froth—such as saponin in the form of extract of quillaja, for example. A skilled operative will be readily able to ascertain by experiment in each case whether it is necessary to add any substance in order to obtain the required formation of froth. He will also be able to decide which particular medium is best suited for the purpose in each case. The froth is formed owing to the movement or agitation of the liquid—that is to say, bubbles are produced which indicate froth.

By the present process a more complete formation of alkaline bicarbonate is formed because by the formation of the bubbles the gases containing carbonic acid diluted with other indifferent gases—as nitrogen, &c.—are caused to be for a longer time than it would be possible according to the old processes in contact with the carbonate liquors. By division of the bubbles the surface of the carbonate composing the outer surface of the bubbles will be enlarged so that the proportion of the gases to the carbonates will be diminished. By this a more complete conversion of the carbonic acid into bicarbonates will be obtained.

If the combining of the carbonic acid with the carbonates has been finished, the bubbles will burst, because by the conversion of the carbonic acid a diminution of the interior pressure of the bubbles enters, whereby the larger exterior pressure causes the bursting of the bubbles. The gases inclosed by the bubbles are chiefly of indifferent nature, not being able to be combined with the carbonates, and may finally escape freely into the atmosphere.

I will now describe the process in connection with a form of an apparatus adopted for its execution.

In the arrangement illustrated in the drawing the gas to be treated and the liquid employed for the formation of bicarbonates pass along a pipe $a$ into a vessel in which a perforated cylinder—a sieve or the like, for example—is caused to rotate with a shaft $h$ by means of driving mechanism $f$. This cylinder $b$ is provided with a cover $c$. In order to obtain efficient closing, a plate $g$ is fixed upon the tube $i$, which is concentric with the shaft $h$. The cover $c$ need not then make a joint with the tube $i$, as the cylinder is sufficiently tightly closed without this.

The sieve-like drum $b$ is caused to rotate, thus producing a formation of froth. The froth bubbles issuing from the apertures of the cylinder $b$ are conducted through a pipe $e$ into a second drum. The bubbles are partly divided into smaller bubbles, partly broken up by and fresh bubbles are formed by the the action of the second sieve-drum, so that the process is several times repeated. If the bubbles from the first cylinder come into contact with the second sieve-drum, they will be divided, the sieve-drum acting like a knife or such like on the bubbles.

What I claim as my invention, and desire to secure by Letters Patent, is—

Process for recovering carbonic acid from gases containing carbonic acid which consists in forming a solution of some carbonate that will readily unite with carbonic acid at ordinary temperature to form a bicarbonate, then introducing some foam-forming substance into this solution, passing the solution and the gases into an agitator and agitating the liquid and gases whereby foam or froth is formed, separating the bubbles from the liquid and breaking up the separated bubbles.

In witness whereof I have hereunto signed my name, this 26th day of November, 1902, in the presence of two subscribing witnesses.

ADOLF WULTZE.

Witnesses:
HENRY HASPER,
WOLDEMAR HAUPT.